United States Patent
Moyer et al.

(10) Patent No.: US 8,131,951 B2
(45) Date of Patent: Mar. 6, 2012

(54) UTILIZATION OF A STORE BUFFER FOR ERROR RECOVERY ON A STORE ALLOCATION CACHE MISS

(75) Inventors: William C. Moyer, Dripping Springs, TX (US); Quyen Pho, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 818 days.

(21) Appl. No.: 12/130,570

(22) Filed: May 30, 2008

(65) Prior Publication Data

US 2009/0300294 A1    Dec. 3, 2009

(51) Int. Cl.
G06F 12/00    (2006.01)
(52) U.S. Cl. .................... 711/154; 711/156
(58) Field of Classification Search .............. 711/154
See application file for complete search history.

(56) References Cited

U.S. PATENT DOCUMENTS

| | | | |
|---|---|---|---|
| 5,418,916 A | 5/1995 | Hall et al. | |
| 5,829,025 A | 10/1998 | Mittal | |
| 6,148,348 A | 11/2000 | Garnett et al. | |
| 6,279,077 B1 * | 8/2001 | Nasserbakht et al. | 711/118 |
| 6,643,745 B1 | 11/2003 | Palanca et al. | |
| 6,851,072 B2 | 2/2005 | Lasserre et al. | |
| 6,968,476 B2 | 11/2005 | Barowski et al. | |
| 2006/0271738 A1 | 11/2006 | Tran et al. | |
| 2008/0109606 A1 | 5/2008 | Lataille et al. | |
| 2008/0168233 A1 * | 7/2008 | Luc et al. | 711/133 |

FOREIGN PATENT DOCUMENTS

WO    99/66406    12/1999

OTHER PUBLICATIONS

PCT Application No. PCT/US2009/038560 Search Report and Written Opinion mailed Jan. 29, 2010.

* cited by examiner

*Primary Examiner* — Tuan Thai
*Assistant Examiner* — Ngoc Dinh
(74) *Attorney, Agent, or Firm* — Joanna G. Chiu; Robert L. King (57) ABSTRACT

A processor and cache is coupled to a system memory via a system interconnect. A first buffer circuit coupled to the cache receives one or more data words and stores the one or more data words in each of one or more entries. The one or more data words of a first entry are written to the cache in response to error free receipt. A second buffer circuit coupled to the cache has one or more entries for storing store requests. Each entry has an associated control bit that determines whether an entry formed from a first store request is a valid entry to be written to the system memory from the second buffer circuit. Based upon error free receipt of the one or more data words, the associated control bit is set to a value that invalidates the entry in the second buffer circuit based upon the error determination.

9 Claims, 8 Drawing Sheets

UTILIZATION OF A STORE BUFFER FOR ERROR RECOVERY ON A STORE ALLOCATION CACHE MISS

BACKGROUND

1. Field

This disclosure relates generally to data processing systems, and more specifically, to utilization of a store buffer for error recovery on a store allocation cache miss.

2. Related Art

In many data processing systems today, when write allocation is supported in a cache for copyback stores, on a cache miss for the store, the store data is placed in a linefill buffer and a fetch is initiated for the line of data for the cache to be merged with the store data, and the cache is then updated with the newly modified cache line. The store data is not written to memory. If an error occurs when fetching the cache line due, for example, to a system error or an uncorrectable memory error from the memory providing the cache line, the line in the linefill buffer cannot be validated and placed in the cache, and the store data from the original store and any subsequent stores to the same line which were temporarily stored into the linefill buffer awaiting a return from memory of the original cache line can be lost. Since, in these systems, there is no easy recovery possible, these errors may result is substantial performance hits.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Errors which occur during cache line fetches within data processing systems may be detrimental to performance and reliability. In one embodiment, a non-writethrough store access which misses in the cache is stored in multiple places upon missing in the cache. For example, it is stored both in a linefill buffer entry (or directly into an allocated cache entry, if no linefill buffer exists) as well as in a store buffer (SB) queue, which is normally used for buffering writethrough store accesses prior to placing them on the system interconnect for storage into system memory. In this manner, the store data from non-writethrough store accesses which miss in the cache are not lost in the case of an error occurring during the corresponding cache line fetch which is merged with the store data for storage in the cache. Since the store data from the non-writethrough store access is also stored in the SB queue as a conditional store access, upon any errors occurring during the corresponding cache line fetch for cache entry allocation, the entry in the SB queue can be converted from a conditional store access to an unconditional store access which will be, upon its turn, written to memory 13. That is, it will then be treated as a writethrough store access. In one embodiment, this is done by including a bit (S) in each entry of the SB queue which indicates whether the entry (if valid, i.e. has its V bit set to 1) is a writethrough store access (an unconditional store access) or a non-writethrough access (a conditional store access). Also, in one embodiment, any number of S bits can be present in each entry, depending on the number of entries in the linefill buffer. In this manner, improved error recovery may be achieved, thus possibly resulting in improved and more reliable performance.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, "address bits [7:0]" or "ADDRESS [7:0]" indicates the eight lower order bits of an address value, and "signal [0:1]" indicates two separate values of a signal (e.g. signal [0] and signal [1]). The symbol "$" preceding a number indicates that the number is represented in its hexadecimal or base sixteen form. The symbol "%" preceding a number indicates that the number is represented in its binary or base two form.

Figure 1:
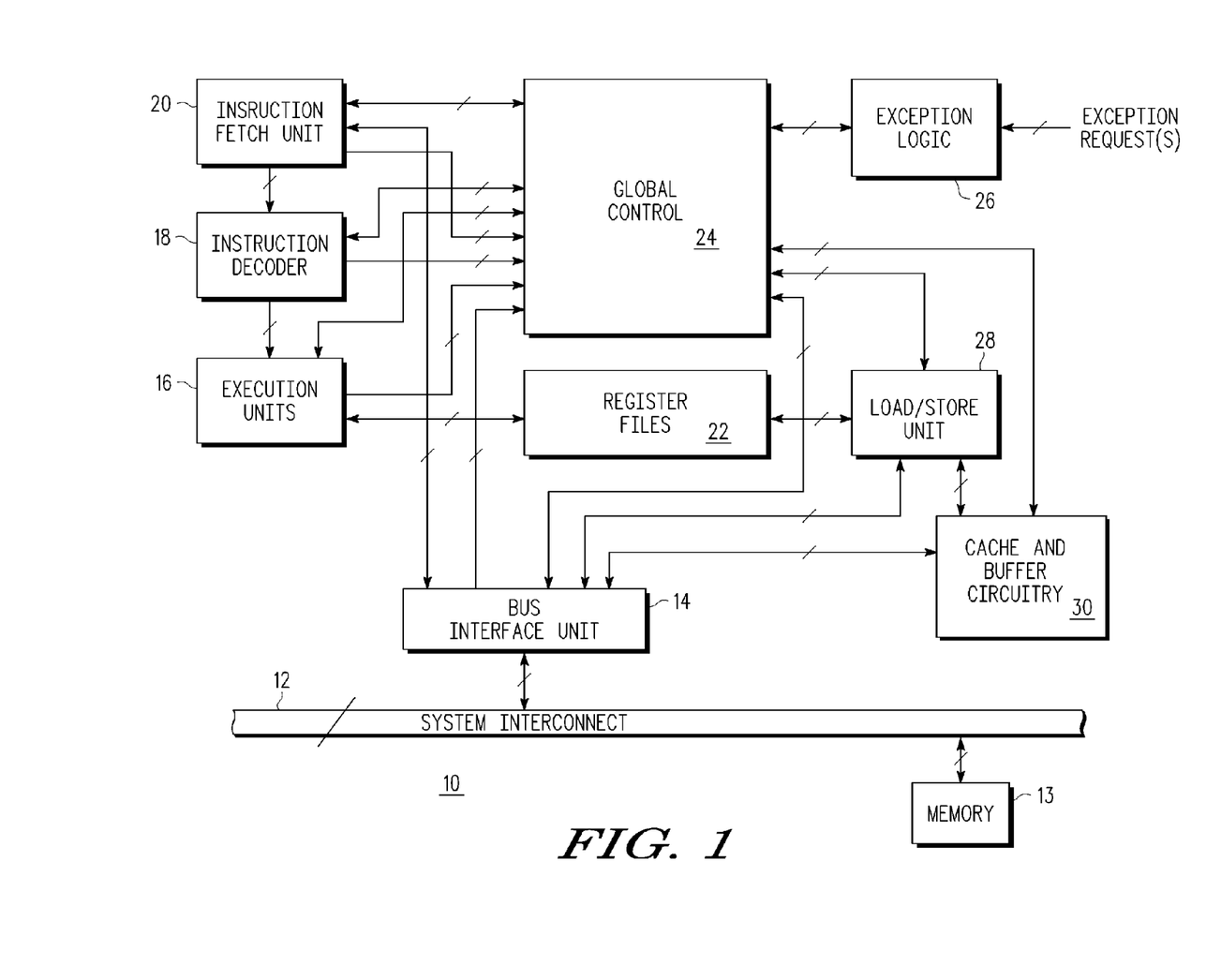
FIG. 1 illustrates, in block diagram form, a data processing system in accordance with one embodiment of the present invention.

FIG. 1 illustrates a data processing system 10 which utilizes a store buffer for error recovery on a store allocation cache miss. A system interconnect 12 functions to communicate data within the data processing system 10. In one embodiment, system interconnect 12 may be implemented as a multiple-bit system bus. Alternatively, it may be implemented as a cross-bar switch, or as a point-to-point or other interconnection mechanism. A system memory 13 is connected to system interconnect 12 for storage of information in data processing system 10. A bus interface unit (BIU) 14 has a first input/output connected to the system interconnect 12. Data processing system 10 also includes one or more execution units 16, an instruction decoder 18, an instruction fetch unit 20, register files 22, global control 24, exception logic 26, a load/store unit 28, and cache and buffer circuitry 30. A second input/output of BIU 14 is connected to a first input/output of instruction fetch unit 20. An output of BIU 14 is connected to a first input of global control 24. A third input/output of BIU 14 is connected to a first input/output of load/store unit 28. A fourth input/output of BIU 14 is connected to a first input/output of cache 30. A second input/output of instruction fetch unit 20 is connected to a first input/output of global control 24. A first output of instruction fetch unit 20 is connected to a second input of global control 24. A second output of instruction fetch unit 20 is connected to an input of instruction decoder 18. An input/output of instruction decoder 18 is connected to a second input/output of global control 24. A first output of instruction decoder 18 is connected to a third input of global control 24. An output of execution units 16 is connected to a fourth input of global control 24. A second output of instruction decoder 18 is connected to a first input of execution units 16. A third input/output of the global control 24 is connected to a first input/output of execution units 16. A second input/output of execution units 16 is connected to a first input/output of registers files 22. A fourth input/output of global control 24 is connected to an input/output of exception logic 26. Exception logic 26 also has an input for receiving exception requests. A fifth input/output of global control 24 is connected to a second input/output of cache 30. A sixth input/output of global control 24 is connected to a second input/output of load/store unit 28. A third input/output of load/store unit 28 is connected to a second input/output of register files 22. A fourth input/output of load/store unit 28 is connected to a third input/output of cache 30. A seventh input/output of global control 24 is connected to fifth input/output of BIU 14. It should be understood that the location of control circuitry within the data processing system 10 is implementation specific. For example, various control circuitry will be located within each of the functional units of instruction fetch unit 20, instruction decoder 18, execution units 16 and register files 22 for more limited control than global control 24. Illustrated conductors and buses that are multiple bit conductors are represented with a slash through the conductor or bus.

In operation, global control 24, instruction fetch unit 20, instruction decoder 18, execution units 16, exception logic 26, register files 22, load/store unit 28, BIU 14, system interconnect 12, and memory 13 all operate as known in the art and will not be described in more detail herein except to the extent needed to describe operation of cache and buffer circuitry 30. Details of cache and buffer circuitry 30 will be provided with respect to FIGS. 2-9. Note that all of system 10 can be located on a single integrated circuit or may be located on a plurality of integrated circuits. Also, note that a variety of different architectures may be used which includes cache and buffer circuitry such as cache and buffer circuitry 30.

Figure 2:
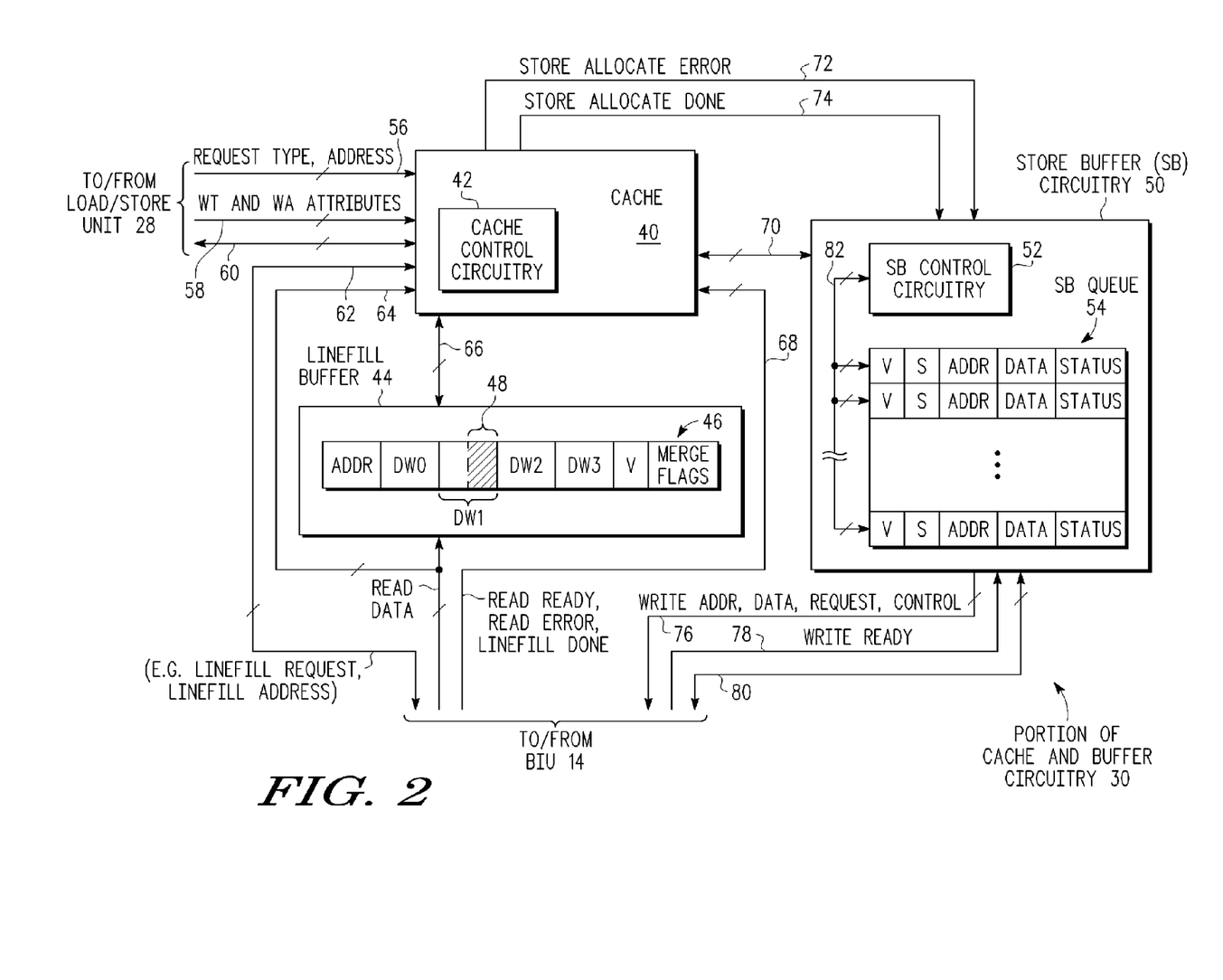
FIG. 2 illustrates, in block diagram form, a portion of the cache and buffer circuitry of the data processing system of FIG. 1, in accordance with one embodiment of the present invention.

FIG. 2 illustrates, in block diagram form, a portion of cache and buffer circuitry 30 of data processing system 10, in accordance with one embodiment of the present invention. Cache and buffer circuitry 30 includes a cache 40, a linefill buffer 44 (also referred to as a first buffer or a reload buffer), and store buffer (SB) circuitry 50. Cache 40 includes cache control circuitry 42 and is bidirectionally coupled to each of load/store unit 28, SB circuitry 50, linefill buffer 44, and BIU 14. Although all inputs and outputs are illustrated as going to or coming from cache 40, some or all of these may be going directly to or directly from cache control circuitry 42 within cache 40.

Cache 40 receives load and store requests from load/store unit 28. Therefore, cache 40 receives a request type (indicating, for example, a store or load type) and a corresponding request address via conductors 56. Cache 40 also receives a writethrough (WT) attribute and a write allocate (WA) attribute corresponding to each load and store request via conductors 58. Other signals may be communicated between load/store unit 28 and cache 40 via bidirectional conductors 60. For example, data may be communicated via a data port of cache 40. Therefore, the store data associated with a store request can be provided to cache 40 via the data port by way of conductors 60.

Cache 40 provides store data from load/store unit 28 (which may be received, for example, via conductors 60) to linefill buffer 44 and receives cache line data from linefill buffer 44 via conductors 66. Note that conductors 66 may therefore be coupled to the data port of cache 40. Also, other signals may be communicated, as needed, between cache 40 and linefill buffer 44 via conductors 66. Cache 40 also receives read data from BIU 14 (which is provided from system interconnect 12 to BIU 14) via conductors 64 and receives a read ready signal, a read error signal, and a linefill done signal from BIU 14 (which receives these signals from system interconnect 12) via conductors 68. Cache control circuitry 42 may, for example, provide the read data, as needed, back to load/store unit 28 via conductors 60. Read data is also provided from BIU 14 to linefill buffer 44 via conductors 64.

Cache 40 provides store data to be written to memory 13 to SB circuitry 50 for storage into an entry of store buffer (SB) queue 54. SB circuitry 50 also includes store buffer (SB) control circuitry 52 which is coupled, via conductors 82, to each entry of SB queue 54 such that SB control circuitry 52 can update appropriate fields of a selected entry, as needed, and can output the next entry to BIU 14. Although all inputs and outputs are illustrated as going to or coming from SB circuitry 50, some or all of these may be going directly to or directly from SB control circuitry 52 or SB queue 54. Cache 40 provides a store allocate error signal to SB circuitry 50 via conductor 72 and a store allocate done signal to SB circuitry 50 via conductor 74. Other signals may be communicated, as needed, between cache 40 and SB circuitry 50 via conductors 70. SB circuitry 50 provides a write address, write data, a write request, and write control to BIU 14 via conductors 76, which can then be communicated to system interconnect 12 by BIU 14. SB circuitry 50 also receives a write ready signal from BIU 14 via conductor 78 which can be communicated from system interconnect 12 by BIU 14. Other signals may be communicated, as needed, between system interconnect 12 (and, e.g., memory 13) and SB circuitry 50 via BIU 14 via conductors 80.

In the illustrated embodiment, linefill buffer 44 includes a single entry, entry 46, which corresponds to a new cache line that is to be stored to cache 40 upon validation of entry 46. Entry 46 includes an address for the cache line, four doublewords of cache line data (DW0, DW1, DW2, and DW3), a valid flag, and merge flags. In the illustrated embodiment, one word includes 4 bytes and one doubleword includes 8 bytes. However, in alternate embodiments, a word may be defined as 2 bytes and a doubleword as 4 bytes. Also, in alternate embodiments, linefill buffer 44 may include any number of entries, and each entry may include any number of doublewords. In the illustrated embodiment, the merge flags include a flag for every byte of DW0-3 to indicate which bytes will get updated with values fetched from memory 13 upon a cache line fill of the linefill buffer entry. These merge flags are therefore used to merge store data written into the linefill buffer entry from a store request from load/store unit 28 with the full cache line data fetched from memory 13. The valid flag indicates whether the entry is valid or not. Upon validation (when V in entry 46 is set, i.e. V=1), the cache line in entry 46 can be stored to cache 40.

SB queue 54 can be implemented in hardware as a circular queue. Each entry in SB queue 54 includes a valid bit (V), a store type bit (S), an address field, a data field, and associated status information. In the illustrated embodiment, each data field is a doubleword and the status information includes size information of the store data that is within the data field. In one embodiment, the S bit of an entry of SB queue 54 indicates whether that entry corresponds to a writethrough store access (i.e. is a writethrough entry) or to a copyback store access (i.e. is a copyback entry). In the illustrated embodiment, each entry includes a single S bit because there is only a single entry in linefill buffer 44. However, note that, depending on the number of linefill buffer entries in linefill buffer 44, more than one S bit may be included in each entry of SB queue 54, as will be described in more detail below.

Note that additional circuitry may be included in cache and buffer circuitry 30, but have been left out of FIG. 2 so as not to complicate the description. For example, cache and buffer circuitry 30 may also include a copyback buffer (not shown) which operates as known in the art. Furthermore, other signals, other than those illustrated, may also be present in cache and buffer circuitry 30.

In operation, cache control circuitry 42 receives load and store requests from load/store unit 28. Note that only store requests, and thus, store accesses (i.e. write accesses), will be discussed herein, where processing of load requests may occur as known in the art. Each store request has a corresponding store address (provided by conductor 56) and associated attributes, and may also be referred to as a store access or a write access. The associated attributes that will be discussed herein are the WT and WA attributes. These attributes can be provided for each store request in a variety of different ways, as known in the art. For example, they may be provided from load/store unit 28 for each store request. Alternatively, they may be provided by a memory management unit (MMU) (not shown), where each memory page has a particular set of attributes. In this case, the memory page which the store request is accessing indicates the values of WT and WA. In yet another example, cache control circuitry 42 itself may generate or provide the WT and WA attributes. Also, in one example, each store request or store access may have its own attribute specifiers.

In one embodiment, when the WT attribute has a value of 1, the store access is a writethrough store access (a store access for which a writethrough to memory 13 is performed), and when the WT attribute has a value of 0, it is a copyback store access or a non-writethrough store access (i.e. a store access for which a writethrough is not performed). As will be discussed in more detail below, any writethrough store accesses are written out to memory 13. This is done by providing the writethrough store access to SB circuitry 50 for storage into an entry of SB queue 54. SB queue 54 may be implemented, for example, as a queue or circular queue (i.e. circular buffer), where the earliest stored entry is provided with each store buffer request to write data to memory 13 (via BIU 14). When a writethrough store access (a store access with WT=1) is stored to an entry of SB queue 54, its corresponding V bit is set to 1 to indicate it is a valid entry and its corresponding S bit is cleared to 0 to indicate that it is a writethrough store access and thus is to be unconditionally written to memory 13.

In one embodiment, when the WA attribute has a value of 1, a write allocate to cache 40 is to be performed upon the store access missing in cache 40. That is, a new cache line is to be allocated in cache 40 corresponding to the address of the store access, where the cache line is fetched from memory 13 and merged with the store data of the store access, and the new merged cache line is placed into cache 40. When the WA attribute has a value of 0, no write allocation to cache 40 is performed for the store access. When a store access is a store access with write allocate (a store access with WA=1) but not a writethrough store access (WT=0), the store access, upon missing in cache 40, is stored to an entry (e.g. entry 46) of linefill buffer 44 as well as to an entry of SB queue 54. In this case, the corresponding V bit in the entry of SB queue 54 is set to 1 to indicate it is a valid entry and its corresponding S bit is also set to 1 to indicate that it is not a writethrough store access (i.e. it is a copyback store access) and thus will be conditionally written to memory 13, depending on whether or not the corresponding cache line fetch into entry 46 of linefill buffer 44 results in an error. That is, upon this store access missing in cache 40, a cache line is fetched from memory into linefill buffer 44 (e.g. entry 46) to be merged with the store data of the store access, and if the corresponding cache line fetch into entry 46 is successfully completed (i.e. without error), then the corresponding entry of the non-writethrough store access in SB queue 54 is flushed (i.e. invalidated) by clearing its corresponding S and V bits. (Note that upon successful loading of entry 46, it is validated, and the cache line in entry 46, including the store data corresponding to the store access which was merged into entry 46 based on the settings of the merge flags, is stored to cache 40, and will, at some point later in time, be made coherent with memory 13.)

However, if the corresponding cache line fetch into entry 46 is not successfully completed (e.g. results in an error during fetching the line from memory 13), then the corresponding entry of the non-writethrough store access in SB queue 54 is converted to a writethrough store access by clearing the S bit to 0 and leaving the V bit set to 1. In this manner, the corresponding entry of the non-writethrough store access is made unconditional as if it were a writethrough store access such that this store access will result in writing the store data to memory 13 rather than getting lost. That is, if the cache line fetch into entry 46 does not successfully complete, then none of the cache line (i.e. none of entry 46), including any new store data merged in with the fetched cache line, such as store data 48, gets written back to cache 40, thus being lost. Therefore, SB queue 54 can be used to store both writethrough store accesses as well as non-writethrough store accesses (i.e. copyback store accesses) where writethrough store accesses are unconditionally written to memory 13 and non-writethrough store accesses are conditionally written to memory 13, based on the result of the cache line fetch into linefill buffer 44. That is, a non-writethrough store access may be temporarily be buffered in an entry of a store buffer used for performing writethrough stores (e.g. SB queue 54) to create a temporarily buffered non-writethrough store buffer entry.

Note that SB queue 54 is normally utilized for performing writethrough stores; however, in one embodiment of the present invention, this same SB queue 54 is also utilized for temporarily buffering or storing non-writethrough store accesses, where the S bit of entry may be used to differentiate between writethrough and non-writethrough store accesses. Furthermore, in an alternate embodiment, note that linefill buffer 44 may not be present. In this case, the new store data of a store access with write allocation (WA=1), upon a cache miss, gets written directly into the allocated entry of cache 40 (as well as to an entry of SB queue 54), and the fetched cache line for that allocated entry gets merged with the new data and stored directly into the allocated entry of cache 40. In this case, each entry of cache 40 may include the merge flags, or merge flags may be stored independently of the entry by cache control circuitry 42. Therefore, for this embodiment, the descriptions provided above with respect to entry 46 and linefill buffer 44 would apply to the case of directly writing the new store data to cache 40, where non-writethrough store accesses in SB queue 54 are conditionally written to memory 13 based on the successful completion or not of the cache line fetch directly into cache 40. Also, note that, regardless of whether a linefill buffer is present or not, any write allocation method known in the art may be used to identify a replacement entry of cache 40 for allocation and to make the current data of the identified entry for replacement coherent with memory.

Operation of FIG. 2 will be described in more detail in reference to FIGS. 3-6 below. Also, in the illustrated embodiment of FIG. 2, store data 48 stored in the last two bytes of DW1 corresponds to store data provided by a store request received by cache control circuitry from load/store unit 28, and is provided as an example.

Figure 3:
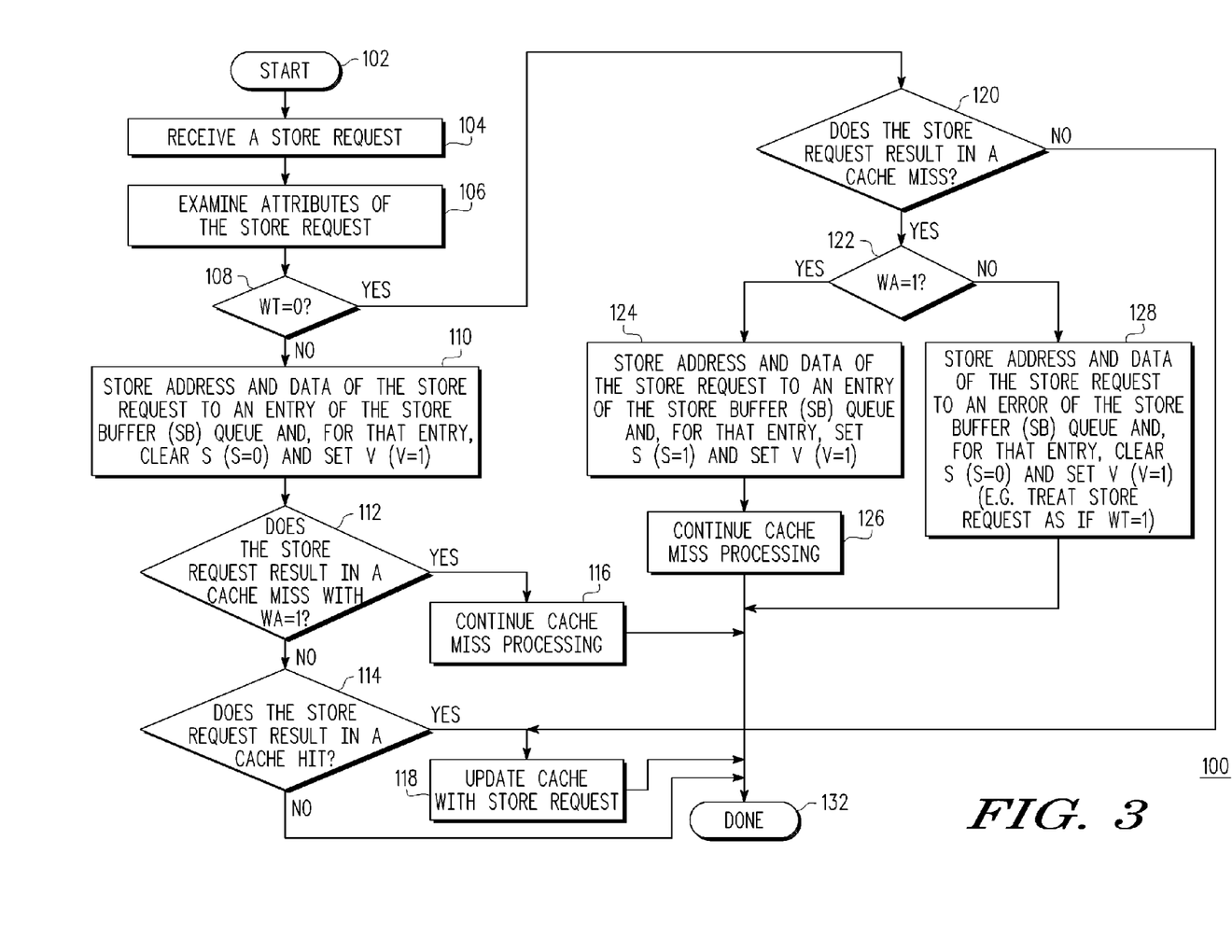
FIG. 3 illustrates, in flow diagram form, operation of the cache and buffer circuitry of FIG. 2 in accordance with one embodiment of the present invention.

FIG. 3 illustrates, in flow diagram form, operation of cache and buffer circuitry 30 from the perspective of cache 40 in accordance with one embodiment of the present invention. Flow 100 begins with start 102 and proceeds to block 104 where cache 40 receives a store request (which may also be referred to as a store access request or a store access). This store request may be received from load/store unit 28, which operates as known in the art. Flow proceeds to block 106 where the attributes of the store request are examined. For example, in one embodiment, both the WT and WA attributes of the store request are examined. Flow proceeds to decision diamond 108 where it is determined whether WT=0. If not (i.e. if WT=1), then the store request is a writethrough request and flow proceeds to block 110 where the store address and store data of the store request is stored to an entry of SB queue 54 and, for that entry, the corresponding S bit is cleared (S=0) and the corresponding V bit is set (V=1). In one embodiment, the store request is stored in a next entry of SB queue 54 selected by SB control circuitry 52 (which, in one embodiment, corresponds to the entry following the latest entry made). Therefore, the writethrough store request (i.e. the writethrough store access) is stored in SB buffer circuitry 50. Flow then proceeds to decision diamond 112 where it is determined if the store requests results in a cache miss with WA=1. If so flow proceeds to block 116 where operation continues with cache miss processing and then flow proceeds to done 132. If, at decision diamond 112, it is determined that the store request does not result in a cache miss with WA=1, flow proceeds to decision diamond 114 where it is determined if the store request results in a cache hit. If so, flow proceeds to block 118 in which cache 40 is updated with the store request and then flow proceeds to done 132. Otherwise, flow proceeds to done 132. Therefore, if the store request results in a cache miss but WA=0, no cache write allocate is performed, and thus cache 40 remains as is.

In one embodiment, cache miss processing with WA=1 includes performing a write allocation to cache 40. During a write allocation, cache control circuitry 42 uses a replacement algorithm to select an entry in cache 40 to be replaced (where any known replacement algorithm, such as, e.g., least recently used or round robin, may be used). If the data of the selected entry is dirty (i.e. has been modified and thus differs from the data stored in memory 13), it is written or flushed to memory 13 via BIU 14. In one embodiment, it is first saved to a buffer (e.g. a copyback buffer) prior to being provided to BIU 14. In this manner, memory 13 is made coherent for this entry, and any known method of flushing may be used. After some or all of the data has been flushed from the selected entry, if needed, the new store request, which missed in cache 40, can be stored into the selected entry. In one embodiment, the store data associated with the store request is stored to entry 46 of linefill buffer 44, where the new store data 48 is located in the second two bytes of DW1. Also, a fetch is initiated for the line of data for the cache line from memory 13, where the merge flags are used to properly merge new store data 48 from the store request with the cache line data fetched from memory. That is, when the new cache line is fetched from memory 13, only DW0, the first two bytes of DW1, DW2, and DW3 of the new cache line fetched from memory 13 are stored into entry 46, such that new data 48 is not overwritten. Assuming no errors occur in filling of the linefill buffer entry, entry 46 is validated (V is set to 1) and it can then be stored to the selected entry of cache 40 to complete the write allocation. Note that the completion of the filling of entry 46 is indicated through the assertion of the linefill done signal received by cache control circuitry 42 from BIU 14, and an indication of no errors is indicated through the negation of the read error signal received by cache control circuitry 42 from BIU 14.

In an alternate embodiment, after some or all of the data has been flushed from the selected entry of cache 40, if needed, the new store request, which missed in cache 40, can be stored directly into the selected entry rather than first being stored in a linefill buffer (which may not be present). In this alternate embodiment, the store data associated with the store request is stored in the entry of cache 40 identified for replacement, where the new store data would still be located in the second two bytes of DW1 for this example. Also, a fetch is initiated for the line of data for the cache line from memory 13, where merge flags are used to properly merge new store data from the store request with the cache line fetched from memory directly into the identified replacement entry of cache 40. Also, assuming no errors occur in filling of the identified entry of cache 40, the identified entry of cache 40 is validated (its corresponding V bit is set to 1) and is marked as dirty or modified, since the new value is now different than that in memory 13.

Note that if errors occur during the cache line fetch for the cache miss processing, entry 46 or the identified entry of cache 40 is not validated. However, the new store data is not lost because it has also been stored in store buffer circuitry 50 (in block 110) and is changed from being conditional (S=1) to unconditional (S=0) to be unconditionally written to memory 13.

Updating cache 40 with the store request (block 118) may include writing the new store data into the existing entry in cache 40 which resulted in the cache hit. Also, appropriate cache entry status information may also be updated. Any known method of doing this cache update may be used.

Referring back to decision diamond 108, if WT=0 for the store request (i.e. the store request is a non-writethrough store request), then flow proceeds to decision diamond 120 where it is determined whether the store request results in a cache miss. If not (i.e. the store request results in a cache hit), flow proceeds to block 118 in which cache 40 is updated with the store request. If so, flow proceeds to decision diamond 122 where it is determined whether WA=1. If so (indicating the store request is a write allocation store access), flow proceeds to block 124 in which the store address and the store data of the store request is stored to an entry of SB queue 54, and, for that entry, the corresponding S bit and V bit are set (S=1, V=1). In one embodiment, the store request is stored in a next entry of SB queue 54 selected by SB control circuitry 52 (which, in one embodiment, corresponds to the entry following the latest entry made). Therefore, the non-writethrough store request (i.e. the non-writethrough store access) is stored in SB buffer circuitry 50 which is typically used for storing writethrough store requests. As was described above, note that the store request stored in SB queue 54 having both its S and V bits set will be conditionally stored to memory 13, depending on whether the cache line fetch for the write allocation for the store request is successfully completed. However, in the case of writethrough store requests, which are stored to SB queue 54 with its S bit cleared, the store request will be unconditionally stored to memory 13.

After block 124, flow proceeds to block 126 in which cache miss processing continues, similar to the cache miss processing described in reference to block 116. However, the cache miss processing of block 126 includes additional error processing for the cache line fetch into entry 46 (or directly into the entry of cache 40 identified for replacement if no linefill buffer is used). That is, as described above, completion of the cache line fetch to entry 46 can be indicated through the assertion of the linefill done signal and an error in this cache line fetch can be indicated through the assertion of the read error signal. In this manner, cache control circuitry 42 knows when the cache line fetch has ended and whether the fetch was successfully (fully completed without errors) or unsuccessful (with an error). Cache control circuitry 42 may then, based on the read error signal and linefill done signal, generate the store allocated error signal and the store allocated done signal, respectively, which are provided to SB control circuitry 52. When an error occurs during the cache line fetch, entry 46 (or the entry of cache 40 identified for replacement) does not get validated, i.e., the corresponding V bit remains cleared (V=0). Also, when SB control circuitry 52 sees that an error occurred during the cache line fetch (through the assertion of the store allocate error signal provided by cache control circuitry 42), SB control circuitry 52 clears any asserted S bits such that any entry which was marked valid (V=1) and yet had its S bit set to '1' to indicate it as a non-writethrough store access is converted to a valid writethrough store access which will get written to memory 13.

Referring back to decision diamond 122, if WA does not equal 1 (i.e., WA=0, indicating no write allocation is to be performed), then flow proceeds to block 128, where the store request is treated as a writethrough store request, even though WT=0 for the store request (determined back at decision diamond 108). That is, in block 128, the store address and store data of the store request is stored to an entry of SB queue 54 and, for that entry, the corresponding S bit is cleared (S=0) and the corresponding V bit is set (V=1), just as was done in block 110 for a writethrough store request. In one embodiment, as described above in reference to block 110, the store request is stored in a next entry of SB queue 54 selected by SB control circuitry 52 (which, in one embodiment, corresponds to the entry following the latest entry made). Therefore, the non-writethrough store request (i.e. the non-writethrough store access) is stored in SB buffer circuitry 50 as if it were a writethrough request. Since its S bit is cleared (S=0), it will be unconditionally written to memory 13. (Note that since WA=0, the store request will not be allocated to cache 40.) After block 128, flow proceeds to done 132.

Figure 4:
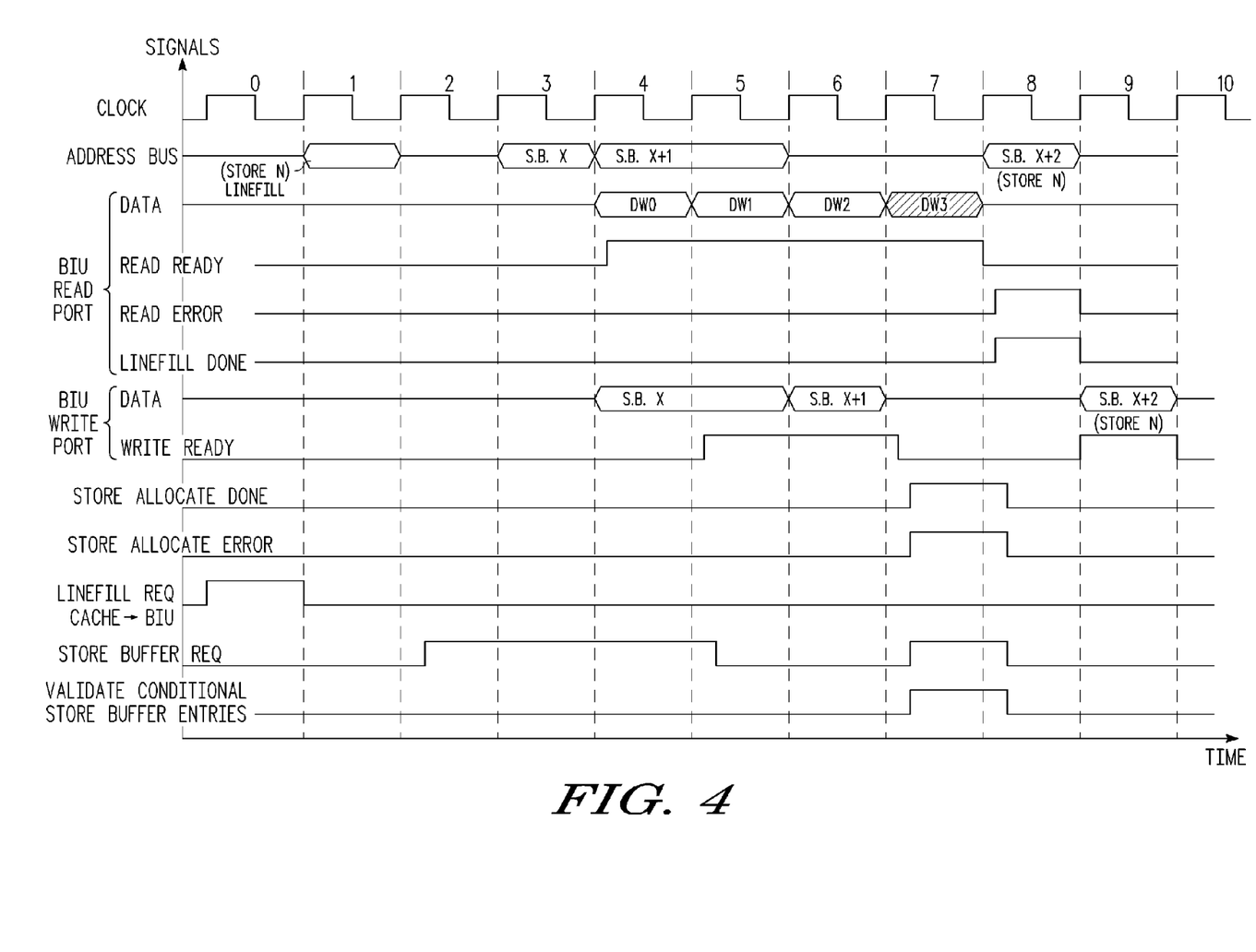
FIGS. 4 and 5 illustrate timing diagrams for various signals within the cache and buffer circuitry of FIG. 2 in accordance with different example scenarios.
Figure 5:
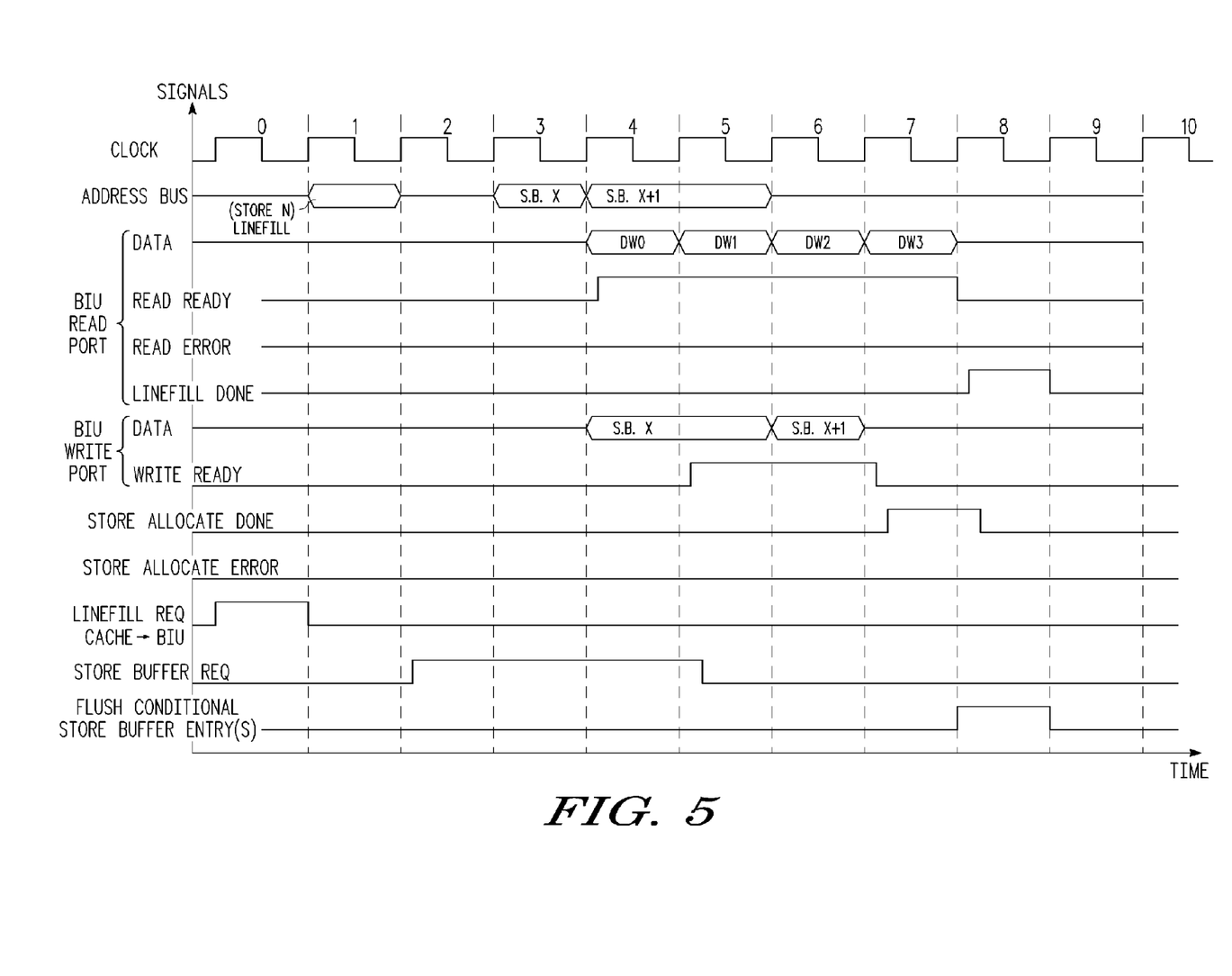

FIGS. 4 and 5 illustrate a timing diagrams for various signals within cache and buffer circuitry 30 in accordance with different example scenarios. In FIG. 4, it is assumed that a linefill error occurs during the cache line fetch, and in FIG. 5, it is assumed that no linefill error occurs during the cache line fetch. On each of FIGS. 4 and 5, the clock cycles are numbered across the top 0-10 for ease of explanation, where, in the illustrated embodiments, each clock cycle includes a high clock phase and a low clock phase. Note also, that in the illustrated embodiments of FIGS. 4 and 5, the BIU read port refers to the inputs which receive signals from system interconnect 12, and may include, for example, read data (provided via conductor 64 from BIU 14), and read ready, read error, and line fill done (provided via conductors 68 from BIU 14). The BIU write port refers to the outputs which provide signals to system interconnect 12, and may include, for example, write data (provided via conductors 76 to BIU 14) and write ready (provided via conductors 78 to BIU 14). Note that other signals may be communicated via the BIU read and write ports, however, those will not be discussed in reference to FIGS. 4 and 5. FIGS. 4 and 5 also include the store allocate done signal (provided via conductor 72 from, e.g., cache control circuitry 42 to SB control circuitry 52), the store allocate error signal (provided via conductor 74 from, e.g., cache control circuitry 42 to SB control circuitry 52), the linefill request signal (provided via conductors 62 from, e.g., cache control circuitry 42 to system interconnect 12 via BIU 14), and a store buffer request (which may be provided via conductors 80 from SB control circuitry 52 to system interconnect 12 via BIU 14). The store buffer request signal may indicate to memory 13 that a next store buffer request from SB queue 54 (output via conductors 76) is to be written to memory. FIG. 4 also includes a validate conditional store buffer entries signal, which may be a signal provided from cache control circuitry 42 to SB control circuitry 52, or may be a signal internally generated by SB control circuitry 52 in response to the store allocate error and the store allocate done signals. FIG. 5 also includes a flush conditional SB entry (an entry whose S bit is set, S=1), which may be a signal provided from cache control circuitry 42 to SB control circuitry 52, or may be a signal internally generated by SB control circuitry 52 in response to the store allocate error and the store allocate done signals).

Referring first to FIG. 4, it is assumed that a linefill error occurs during the cache line fetch. Therefore, starting with clock cycle 0, the linefill request signal is asserted to indicate that a cache line needs to be fetched from memory 13, in response to a store miss with write allocation for Store N. Thus, this request signal is sent to memory 13 via BIU 14 and system interconnect 12. This linefill request signal can be generated by cache control circuitry 42 when performing a write allocation in response to a store request missing within cache 40, as was described above. Therefore, in clock cycle 1, the store address corresponding to the requested cache line fill (Store N linefill) is placed on the address bus via CIU 14. (Note that in the illustrated examples of FIGS. 4 and 5, it is assumed that system interconnect 12 includes separate data and address busses, and that a common address bus is used for both data read and data write ports.) The data for the cache line fill does not begin to return to BIU 14 until clock cycle 4, during which DW0 is received. The read ready signal is also asserted in cycle 4, thus the doubleword DW0 can be accepted by cache control circuit 42 to be provided to linefill buffer 44 at the end of cycle 4. During each subsequent cycle, a next doubleword of the cache line fetch is to be received until, ideally, all 4 doublewords (DW0-DW3) are received.

Between cache control circuitry 42 sending out the cache line fill address and the corresponding data returning, SB control circuitry 52 asserts the store buffer request signal such that unconditional entries in SB queue 54 may be written to memory 13. Therefore, during clock cycle 2, the store buffer request signal is asserted, and SB circuitry 50 provides the address corresponding to the next entry of SB queue 54 (SB X, where "X" refers to the next entry) to be written to memory to BIU 14 to be placed on the address bus of system interconnect 12 (this next entry may be selected by SB control circuitry 52) in the following clock cycle, cycle 3. During clock cycle 3, SB circuitry 50 provides the store data corresponding to this next entry of SB queue 54 (SB X) to BIU 14 to be placed on the data bus of system interconnect 12 in clock cycle 4. That is, in the current example, it is assumed that SB circuitry 50 first provides the address to BIU 14 and, in a subsequent clock cycle, provides the corresponding data to BIU 14. System interconnect 12 is driven with the address and data provided in the clock cycle after receipt by the BIU 14 from the SB circuitry 50. Also, during clock cycle 3, since the store buffer request signal is still asserted, SB circuitry 50 provides the address corresponding to the next entry of SB queue 54 (SB X+1) to BIU 14 to be placed on the address bus of system interconnect 12 in clock cycle 4.

However, during clock cycle 4, the write ready signal has not yet been asserted by BIU 14, due to the fact that system interconnect 12 has not yet completed the store associated with the address of SB X. Therefore, BIU circuitry 14 continues to provide the store data corresponding to SB X during cycle 5, and continues to supply the address of the next store request, the address of SB X+1. In clock cycle 5, the first write request is completed, and the write ready signal is asserted, and the address of SB X+1 provided to system interconnect 12 is captured by memory 13. Similarly, during clock cycle 6, the store data corresponding to SB X+1 is provided by BIU 14 to the system interconnect 12, the cycle after successful presentation and capturing of the address. Since the write ready signal is asserted at the end of cycle 6, the store data placed onto system interconnect 12 has been successfully captured by memory 13, and the write cycle for SB X+1 completes. Also, during clock cycle 5, the store buffer request signal is negated, such that the next entry (SB X+2, corresponding to Store N, whose cache miss initiated the linefill in cycle 0) is not yet provided to BIU 14, since this entry is marked as a conditional store, with S=1 and V=1, and the linefill request initiated by the cache in cycle 0 is not yet complete.

Referring back to the cache line fetch, note that DW0, which was received from memory 13 via system interconnect 12, is returned from BIU 14 to cache control circuitry 42 in clock cycle 4. Note that the read ready signal is asserted, indicating to cache control circuitry 42 that BIU 14 is providing read data, and that the read error signal is negated, indicating no error occurred during the return of DW0. The linefill done signal is also negated because the cache line fetch of 4 doublewords is not yet complete. In each of cycles 5 and 6, DW1 and DW2, respectively, are returned in a similar manner, with read ready asserted, read error negated, and linefill done negated. However, in cycle 7, the read error signal is asserted, indicating that an error occurred during the memory fetch of DW3. This error may be, for example, due to a system error or an uncorrectable memory error from memory 13 which is providing the cache line. Also, in cycle 7, the linefill done signal is asserted since the linefill request is completing. In response to the assertion of the read error signal and the linefill done signal provided by BIU 14 to cache control circuitry 42, cache control circuitry 42, also in clock cycle 7, asserts both the store allocate error signal and the store allocate done signal. In this manner, SB control circuitry 52 knows that the conditional store buffer entries are to be validated, thus converting the conditional store buffer entries (whose V bits and S bits are set to 1), if any, to unconditional store buffer entries whose V bits remain set to 1, but whose S bits are cleared to 0, as was described above). This is indicated, for example, by the assertion of the validate conditional store buffer entries signal in clock cycle 7 of FIG. 4.

In response to the assertion of the validate conditional store buffer entries signal in clock cycle 7, entry SB X+2 is validated, and changes state from a conditional store to an unconditional store to be written to memory 13, due to the unsuccessful linefill for a write allocation for the original store, Store N. SB entry X+2 contains the store address, data, and relevant status information to allow Store N to be written through to memory, rather than to simply be lost or discarded, since linefill buffer 44 was not successfully filled, and therefore not validated for storage into the cache. Note that the store buffer request signal is again asserted in clock cycle 7, due to the validation of store buffer entry X+2, whose S=1, V=1 status information is changed to S=0, V=1 in response to the assertion of the validate conditional store buffer entries signal in clock cycle 7. Then, in clock cycle 8, the address corresponding to the next entry (SB X+2) is provided by BIU 14 to system interconnect 12, and in clock cycle 9, the store data corresponding to this next entry (SB X+2) is provided by BIU 14. In clock cycle 9, the store to memory completes, and the write ready signal is asserted again in clock cycle 9. Note that store buffer request is negated in cycle 5 by SB control circuitry 52, since the store buffer entry at the head of the queue is marked with S=1 and V=1, and is awaiting either validation or invalidation, based on the successful completion of the allocation linefill. Even though a valid entry exists in SB queue 54, the store buffer request may not yet be asserted, since normally this store is not to be performed to memory 13, since it was a non-writethrough store. However, since the linefill request did not complete successfully, the store data is eventually written.

Referring now to FIG. 5, it is assumed that no linefill errors occur during the cache line fetch. The description of clock cycles 0-6 of FIG. 4 provided above also apply to clock cycles 0-6 of FIG. 5, and therefore will not be repeated. Therefore, referring now to clock cycle 7 of FIG. 5, note that DW3, the last doubleword of the cache line fetch, is provided by BIU 14 to cache control circuitry 42. Also, in clock cycle 7, the linefill done signal is asserted by BIU 14 to indicate that the cache line fetch is complete. However, unlike in the example of FIG. 4, here, in clock cycle 7 (or in any of clock cycles 4-7), the read error signal was not asserted, indicated no linefill errors occurred. Therefore, also in clock cycle 7, cache control circuitry 42 asserts only the store allocate done signal, but did not have to assert the store allocate error signals in any of clock cycles 4-7. In this manner, SB control circuitry 52 knows that the conditional store buffer entries (whose V bits and S bits are set to 1), if any, are to be flushed (invalidated) by clearing both the V and S bits (V=0 and S=0). This is indicated, for example, by the assertion of the flush conditional store buffer entries in clock cycle 8 of FIG. 5. In this example, since successful linefill allocation has occurred, the store data for Store N is merged in the linefill buffer with the linefill data returned from memory 13, and the line is then stored in cache 40. No write to memory 13 for the store is performed at this time, since Store N was a non-writethrough store.

Figure 6:
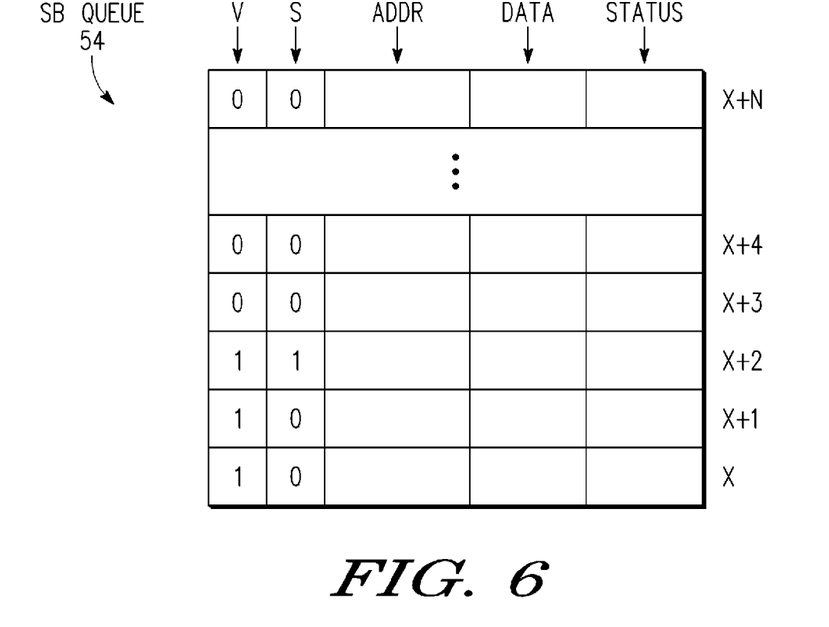
FIGS. 6 and 7 illustrate a portion of the store buffer queue of the cache and buffer circuitry of FIG. 2 in accordance with different example scenarios.
Figure 7:
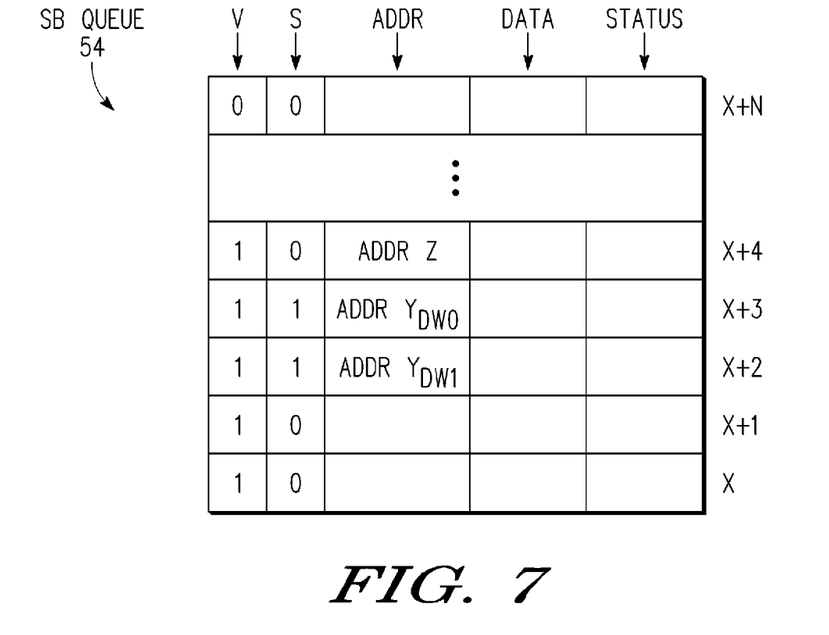

FIGS. 6 and 7 illustrate a portion of the SB queue 54 in accordance with different example scenarios. Referring first to FIG. 6, FIG. 6 illustrates a portion of SB queue 54 which includes two unconditional store accesses (in entries X and X+1) whose valid bits are set (V=1) but whose S bits are cleared (S=0), thus indicating a valid writethrough store access. The next entry (X+2, i.e. the latest entry in time) includes a conditional store access whose valid and S bits are set (V=1 and S=1), thus indicating a valid non-writethrough store which will either be flushed from SB queue 54 if the corresponding cache line fill finishes without error or will be converted to a writethrough store access (by clearing the S bit) if the corresponding cache line fill results in an error. Note that while a cache line fetch is occurring in response to a cache line fill request, subsequent store accesses to the same cache line may be processed. For example, the snapshot in time of SB queue 54 in FIG. 6 may correspond to the beginning of a linefill request, whereas the snapshot in time of SB queue 54 in FIG. 7 may illustrate what is added to SB queue 54 while the cache line fetch is in progress.

For example, referring to FIG. 7, it is assumed that the cache line fetch preformed in response to a cache miss by the store access whose corresponding store data got stored into entry X+2 is still occurring. That is, the fetching of DW0-DW3 has not yet been completed. However, during the fetching of DW0-DW3, a subsequent store access to the same cache line also misses in cache 40 and, while the fetch of DW0-DW3 is still occurring, also gets written to a next entry, X+3, of SB queue 54. Therefore, note that each of entries X+2 and X+3 correspond to a same cache line, but to different doublewords of the cache line. For example, X+2 may be in DW1 of the cache line at address, ADDRY, while X+3 may be in DW0 of that same cache line (at ADDRY). Furthermore, while the fetch of DW0-DW3 is still occurring, yet another store access may be processed by cache control circuitry 42 where this store access is a writethrough store access to address ADDRZ. This also gets placed into a next entry, X+4, of SB queue 54. However, unlike the entries X+3 and X+2, the S bit of entry X+4 is not set (i.e. S=0), since it is a writethrough store. Therefore, note that multiple conditional, non-writethrough, entries such as X+3 and X+2 may be entered into SB queue 54 during a cache line fetch.

Also, still referring to the example of FIG. 7, with each store buffer request to write a next entry from SB queue 54 to memory 13 via BIU 14, as was described in reference to FIG. 4, SB control circuitry 52 selects the earliest entry in time to output to BIU 14. In the illustrated example of FIG. 7, the entry X is considered the earliest in time (followed by X+1, X+2, X+3, X+4, in that order). That is, SB queue 54 in FIGS. 6 and 7 may be described as a circular buffer (or circular queue). Therefore, upon assertion of the store buffer request signal, and assuming that the write ready signal is also asserted, the address of entry X is provided to BIU 14, followed, in the next clock cycle, by the store data of entry X. The next entry to be provided then corresponds to entry X+1. Therefore, assuming the store buffer request signal remains asserted, or upon the next time it is asserted, the address of entry X+1 and the store data of X+1 are provided to BIU 14. The next entry to be provided then corresponds to entry X+2. However, it is possible that the entries X+2 and X+3 may not yet be validated or flushed because the cache line fetch may still be occurring. In this case, even if the store buffer has valid entries, the store buffer request signal is negated, and a store access is not provided from SB queue 54 to BIU 14. That is, the emptying of SB queue 54 is stalled until the next entry to be output corresponds to a valid, unconditional store access with V=1 and S=0. Therefore, once the cache line fetch completes, and it completes without errors, each of entries X+2 and X+3 are flushed, i.e. invalidated, from SB queue 54. That is, each of the V and S bits of entries X+2 and X+3 are cleared (V=0 and S=0). Therefore, if the store buffer request signal is asserted, the next valid unconditional entry (the earliest valid entry in time), which corresponds to entry X+4 in this example, is selected by SB control circuitry 52 to be provided to BIU 14. However, if the cache line fetch ends in error, each of entries X+2 and X+3 are converted to writethrough entries by clearing the S bits of these entries. Then, when the store buffer request signal is asserted, the next unconditional valid entry, validated entry X+2, is provided to BIU 14, followed in turn by validated entry X+3, and then by entry X+4.

In an alternate embodiment, rather than stalling the emptying of SB queue 54 when the next valid entry is a conditional entry whose S bit is set, SB control circuitry 52 may search for the next valid unconditional entry, thus emptying SB queue 54 out of order.

Figure 8:
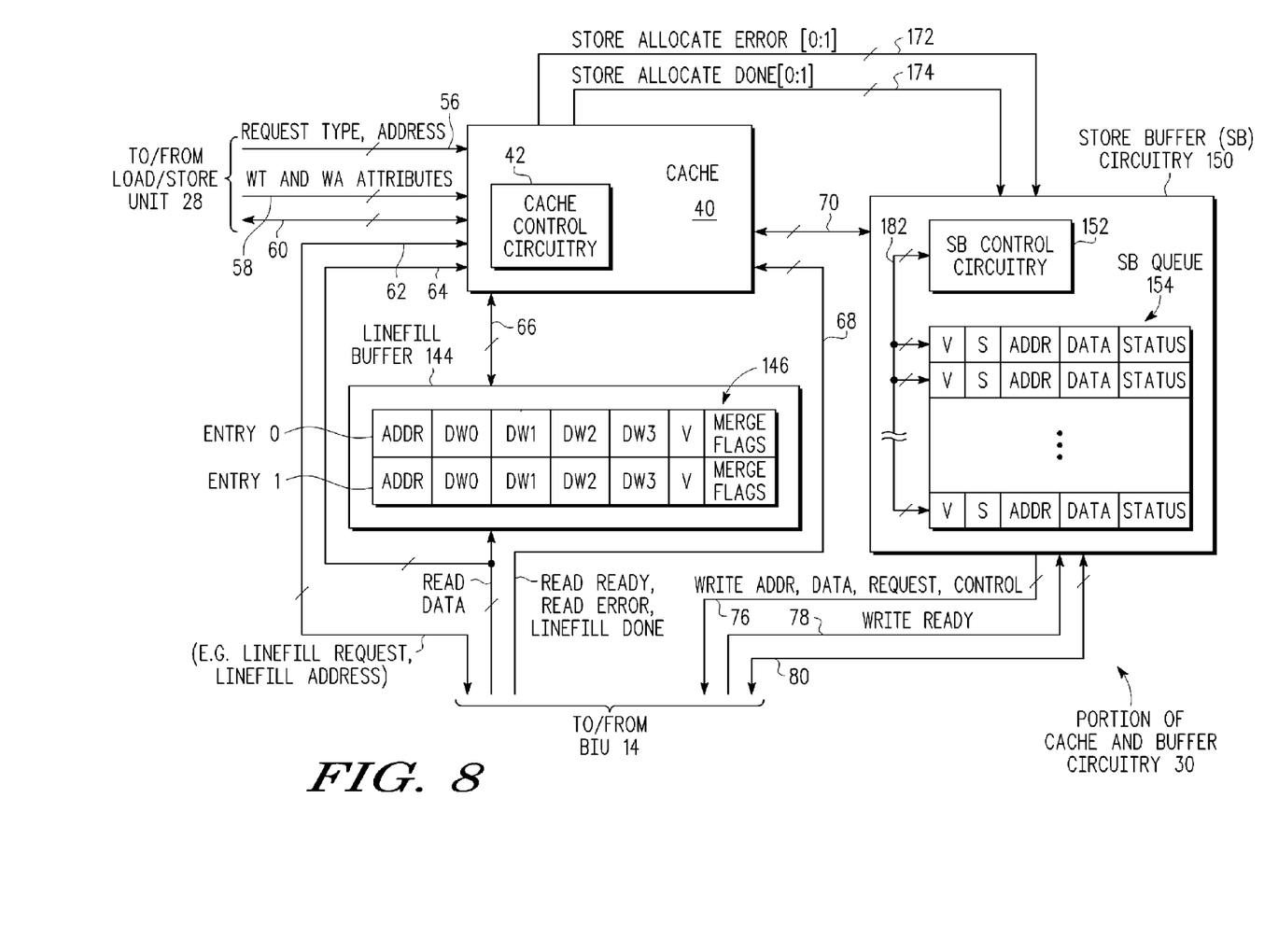
FIG. 8 illustrates, in block diagram form, a portion of the cache and buffer circuitry of the data processing system of FIG. 1, in accordance with one embodiment of the present invention.

FIG. 8 illustrates, in block diagram form, a portion of cache and buffer circuitry 30 of data processing system 10, in accordance with an embodiment of the present invention in which the linefill buffer includes multiple entries, and thus each entry in the SB queue includes multiple S bits, one corresponding to each linefill buffer entry. Referring to FIG. 8, in which like reference numbers with respect to FIG. 2, indicate like elements, cache and buffer circuitry 30 includes a linefill buffer 144 (analogous to linefill buffer 44 of FIG. 2) which includes two entries, entry 0 146 and entry 1. Due to the two entries, cache control circuitry 42 is able to concurrently process two write allocate store requests which result in cache line fetches of two different cache lines. Also, due to the existence of two entries in linefill buffer 144, cache control circuitry 42 provides to SB control circuitry 152 (analogous to SB control circuitry 52) with two store allocate error signals, store allocated error [0:1], and two store allocate done signals, store allocate done [0:1], one corresponding to each entry of linefill buffer 144. SB circuitry 150 (analogous to SB circuitry 50) includes an SB queue 154 which is similar to SB queue 54 except that each entry includes two S bits, an S0 bit corresponding to entry 0 of linefill buffer 144 and an S1 bit corresponding to entry 1 of linefill buffer 144. Therefore, S0 indicates whether the cache line fill of entry 0 corresponds to a store access which is a writethrough access or a non-writethrough access while S1 indicates whether the cache line fill of entry 1 corresponds to a store access which is a writethrough access or a non-writethrough access.

Operation of linefill buffer 144 and SB circuitry 150 is similar to that described above with respect to linefill buffer 44 and SB circuitry 50. However, when a write allocate store access to cache 40 results in a miss, and cache control circuitry 42 requests a cache line fill to entry 0 of linefill buffer 144, the store data gets written to both entry 0 and to an entry of SB queue 154, where the V bit of the entry is set (V=1), the S0 bit of the entry is set (S0=1), but the S1 bit of the entry is cleared (S1=0) since this entry corresponds to a cache line fill of entry 0. The remaining fields of the entry of SB queue 154 are updated in the same manner as in SB queue 54. Also, the store data in entry 0 of linefill buffer 144 is merged with the cache line fetch data, as was described above. Therefore, when a cache line fill of entry 0 results in error, then each conditional entry in SB queue 154 which corresponds to entry 0 (whose V bit and S0 bit are set, V=1 and S0=1) is converted to an unconditional store access, i.e. a writethrough store access, by maintaining the V bit set and clearing the S0 bit (S0=0) where the S1 bit should also be 0. Therefore, for a cache line fill of entry 0, it is the S0 bit that is examined in SB queue 154 when the line fill for entry zero is completed.

Similarly, when a write allocate store access to cache 40 results in a miss, and cache control circuitry 42 requests a cache line fill to entry 1 of linefill buffer 144, the store data gets written to both entry 1 and to an entry of SB queue 154, where the V bit of the SB queue entry is set (V=1), the S1 bit of the entry is set (S1=1), but the S0 bit of the entry is cleared (S0=0) since this entry corresponds to a cache line fill of entry 1. The remaining fields of the entry of SB queue 154 get updated in the same manner as in SB queue 54. Also, the store data in entry 1 is merged with the cache line fetch data, as was described above. Therefore, when a cache line fill of entry 1 results in error, then each conditional entry in SB queue 154 which corresponds to entry 1 (whose V bit and S1 bit are set, V=1 and S1=1) is converted to an unconditional store access, i.e. a writethrough store access, by maintaining the V bit set and clearing the S1 bit (S1=0) where the S0 bit should also be 0. Therefore, for a cache line fill of entry 1, it is the S1 bit that is examined in SB queue 154 when the line fill for entry 1 of linefill buffer 144 completes.

Figure 9:
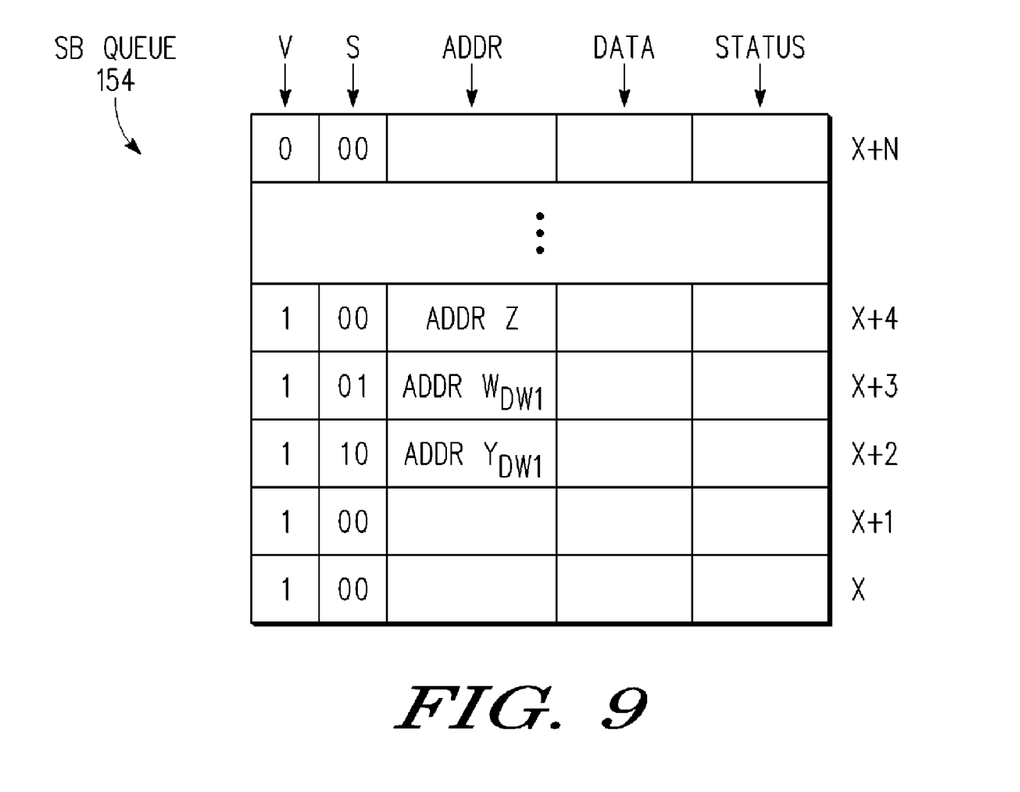
FIG. 9 illustrates a portion of the store buffer queue of the cache and buffer circuitry of FIG. 8 in accordance with one example scenario.

For example, FIG. 9 illustrates a portion of SB queue 154 in which entries X+2 and X+3 correspond to non-writethrough entries. Also, in the illustrated example of FIG. 9, the first bit, i.e. the leftmost bit, of the S field is the S0 bit, and the second bit, i.e. the rightmost bit, of the S field is the S1 bit. In the example of FIG. 9, it is assumed that a cache line fetch to the address, ADDRY, is being performed in entry 0 of linefill buffer 144, and a cache line fetch to the address, ADDRW, is being performed in entry 1 of linefill buffer 144. In the case of entry 0, the store data corresponding to the store access is to DW1 of the cache line fetched from ADDRY, and the corresponding V and S0 bits of entry X+2 are set (V=1 and S0=1, where S1 remains cleared to 0). In the case of entry 1, the store data corresponding to the store access resulting in that cache line fill is to DW1 of the cache line fetched from ADDRW, and the corresponding V and S1 bits of entry X+3 are set (V=1 and S1=1, where S0 remains cleared to 0). Depending on how the cache line fill of entry 0 finishes, entry X+2 will either be validated or flushed (however, the result of the cache line fill of entry 0 will not affect entry X+3, whose S0 bit is cleared). Similarly, depending on how the cache line fill of entry 1 finishes, entry X+3 will either be validated or flushed (however, the result of the cache line fill of entry 1 will not affect entry X+2, whose S1 bit is cleared).

As described above, SB queue 154 may be emptied while cache line fetches to linefill buffer 144 are in progress. In one embodiment, if the next entry to be provided in response to assertion of the store buffer request signal is entry X+2, the emptying of SB queue 154 is stalled since entry X+2, with its S0 bit set, is still a conditional store access entry. That is, in one embodiment, if either the S0 or S1 bit of the next entry to be output from SB queue 154 is set, the emptying of the queue is stalled.

By now it should be appreciated that there has been provided a mechanism for storing a non writethrough store access in two different places upon missing in the cache. That is, it is stored both in a linefill buffer entry (or directly into an allocated cache entry, if no linefill buffer exists) as well as in the SB queue (which is normally used only for storing writethrough store accesses). In this manner, the store data from non-writethrough store accesses which miss in the cache are not lost in the case of an error occurring during the corresponding cache line fetch which is merged with the store data for storage in the cache. Since the store data from the non-writethrough store access is also stored in the SB queue as a conditional store access, upon any errors in the corresponding cache line fetch, the entry in the SB queue can be converted from a conditional store access to an unconditional store access which will be, upon its turn, written to memory 13. That is, it will then be treated as a writethrough store access. In one embodiment, this is done by including a bit (S) in each entry of the SB queue which indicates whether the entry (if valid, i.e. has its V bit set to 1) is a writethrough store access (an unconditional store access) or a non-writethrough access (a conditional store access). Also, in one embodiment, any number of S bits can be present in each entry, depending on the number of entries in the linefill buffer. In this manner, improved error recovery may be achieved, thus possibly resulting in improved and more reliable performance.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 1, 2, and 8 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 or portions thereof may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, linefill buffers may or may not be present within the cache and buffer circuitry. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
    a processor coupled to a system memory via a system interconnect;
    a cache coupled to the processor, the cache storing data and having a first data port and one or more control inputs for receiving control information;
    a first buffer circuit coupled to the cache for receiving one or more data words from the system interconnect, the first buffer circuit storing the one or more data words in each of one or more entries, the one or more data words of a first entry of the one or more entries to be written to the cache in response to error free receipt of the one or more data words from the system interconnect;
    a second buffer circuit coupled to the cache, the second buffer circuit having one or more entries for storing store requests, each entry having an associated control bit that determines whether an entry formed from a first store request is a valid entry to be written to the system memory from the second buffer circuit, wherein the first buffer circuit comprises a linefill buffer and the second buffer circuit comprises a store buffer for writethrough stores;
    control circuitry coupled to the cache and second buffer circuitry, the control circuitry providing an error determination whether error free receipt of the one or more data words occurred and selectively setting the associated control bit to a value that invalidates the entry in the second buffer circuit based upon the error determination; and
    a valid bit associated with a predetermined store request for establishing validity of the predetermined store request in the second buffer circuit separate from the associated control bit, the associated control bit invalidating the predetermined store request in the second buffer circuit if the error determination indicates that no error occurred in filling a correlated entry of the first buffer circuit.

2. The data processing system of claim 1 further comprising a plurality of control bits associated with the predetermined store request in the second buffer circuit, each of the plurality of control bits being correlated to a different entry in the first buffer circuit, the control circuitry using only one of the plurality of control bits to indicate invalidation of the predetermined store request in the second buffer circuit.

3. The data processing system of claim 1 wherein the second buffer circuit further comprises a plurality of entries correlated to different portions of the first entry of the first storage buffer.

4. A data processing system comprising:
    a processor coupled to a system memory via a system interconnect;
    a cache coupled to the processor, the cache storing data and having a first data port and one or more control inputs for receiving control information;
    a first buffer circuit coupled to the cache for receiving one or more data words from the system interconnect, the first buffer circuit storing the one or more data words in each of one or more entries, the one or more data words of a first entry of the one or more entries to be written to the cache in response to error free receipt of the one or more data words from the system interconnect;
    a second buffer circuit coupled to the cache, the second buffer circuit having one or more entries for storing store requests, each entry having an associated control bit that determines whether an entry formed from a first store request is a valid entry to be written to the system memory from the second buffer circuit; and
    control circuitry coupled to the cache and second buffer circuitry, the control circuitry providing an error determination whether error free receipt of the one or more data words occurred and selectively setting the associated control bit to a value that invalidates the entry in the second buffer circuit based upon the error determination,
    wherein when the error determination indicates no error and the associated control bit is asserted, the control circuitry deasserts the associated control bit and a validity bit of an entry in the second buffer circuit associated with the first store request to invalidate the first store request, and when the error determination indicates an error and the associated control bit is asserted, the control circuitry deasserts the associated control bit and asserts the validity bit of the entry in the second buffer circuit associated with the first store request to validate the first store request.

5. A method comprising:

coupling a processor to a system memory via a system interconnect;

coupling a cache coupled to the processor, the cache storing data and having a first data port and one or more control inputs for receiving control information;

coupling a first buffer circuit to the cache for receiving one or more data words from the system interconnect, the first buffer circuit storing the one or more data words in each of one or more entries, the one or more data words of a first entry of the one or more entries to be written to the cache in response to error free receipt of the one or more data words from the system interconnect;

coupling a second buffer circuit to the cache, the second buffer circuit having one or more entries for storing store requests, each entry having an associated control bit that determines whether an entry formed from a first store request is a valid entry to be written to the system memory from the second buffer circuit;

coupling control circuitry to the cache and second buffer circuitry, the control circuitry providing an error determination whether error free receipt of the one or more data words occurred and selectively setting the associated control bit to a value that invalidates the entry in the second buffer circuit based upon the error determination;

implementing the first buffer circuit as a linefill buffer;

implementing the second buffer circuit as a store buffer for writethrough stores;

providing a valid bit associated with a predetermined store request for establishing validity of the predetermined store request in the second buffer circuit separate from the associated control bit; and invalidating the predetermined store request in the second buffer circuit with the associated control bit if the error determination indicates that no error occurred in filling a correlated entry of the first buffer circuit.

6. The method of claim 5 further comprising:

providing a plurality of control bits associated with the predetermined store request in the second buffer circuit, each of the plurality of control bits being correlated to a different entry in the first buffer circuit, the control circuitry using only one of the plurality of control bits to indicate invalidation of the predetermined store request in the second buffer circuit.

7. The method of claim 5 further comprising:

providing a plurality of entries in the second buffer circuit that are correlated to different portions of the first entry of the first buffer circuit.

8. A method comprising:

coupling a processor to a system memory via a system interconnect;

coupling a cache coupled to the processor, the cache storing data and having a first data port and one or more control inputs for receiving control information;

coupling a first buffer circuit to the cache for receiving one or more data words from the system interconnect, the first buffer circuit storing the one or more data words in each of one or more entries, the one or more data words of a first entry of the one or more entries to be written to the cache in response to error free receipt of the one or more data words from the system interconnect;

coupling a second buffer circuit to the cache, the second buffer circuit having one or more entries for storing store requests, each entry having an associated control bit that determines whether an entry formed from a first store request is a valid entry to be written to the system memory from the second buffer circuit;

coupling control circuitry to the cache and second buffer circuitry, the control circuitry providing an error determination whether error free receipt of the one or more data words occurred and selectively setting the associated control bit to a value that invalidates the entry in the second buffer circuit based upon the error determination;

deasserting the associated control bit and a validity bit of an entry in the second buffer circuit associated with the first store request to invalidate the first store request when the error determination indicates no error and the associated control bit is asserted; and deasserting the associated control bit and asserting the validity bit of the entry in the second buffer circuit associated with the first store request to validate the first store request when the error determination indicates an error.

9. A method comprising:

coupling a processor to a system memory via a system interconnect;

coupling a cache coupled to the processor, the cache storing data and having a first data port and one or more control inputs for receiving control information;

coupling a first buffer circuit to the cache for receiving one or more data words from the system interconnect, the first buffer circuit storing the one or more data words in each of one or more entries, the one or more data words of a first entry of the one or more entries to be written to the cache in response to error free receipt of the one or more data words from the system interconnect;

coupling a second buffer circuit to the cache, the second buffer circuit having one or more entries for storing store requests, each entry having an associated control bit that determines whether an entry formed from a first store request is a valid entry to be written to the system memory from the second buffer circuit;

coupling control circuitry to the cache and second buffer circuitry, the control circuitry providing an error determination whether error free receipt of the one or more data words occurred and selectively setting the associated control bit to a value that invalidates the entry in the second buffer circuit based upon the error determination;

filling a first portion of the first entry of the one or more entries of the first buffer circuit with store data from a load/store unit coupled to the cache; and filling a second portion of the first entry of the one or more entries of the first buffer circuit with data from the system interconnect, wherein the error determination determines that the one or more data words from the system interconnect is erroneous.

* * * * *